United States Patent
Bi et al.

(10) Patent No.: US 11,448,527 B2
(45) Date of Patent: Sep. 20, 2022

(54) MAGNETIC ENCODER, METHOD, SYSTEM FOR DETECTING ABSOLUTE ELECTRICAL ANGLE, AND READABLE STORAGE MEDIUM

(71) Applicant: FORTIOR TECHNOLOGY (SHENZHEN) CO., LTD., Shenzhen (CN)

(72) Inventors: Chao Bi, Shenzhen (CN); Lei Bi, Shenzhen (CN)

(73) Assignee: FORTIOR TECHNOLOGY (SHENZHEN) CO., LTD., Shenzhen (CN)

( * ) Notice: Subject to any disclaimer, the term of this patent is extended or adjusted under 35 U.S.C. 154(b) by 297 days.

(21) Appl. No.: 16/794,729

(22) Filed: Feb. 19, 2020

(65) Prior Publication Data
US 2021/0190541 A1  Jun. 24, 2021

(30) Foreign Application Priority Data
Dec. 23, 2019 (CN) .......................... 201911340528.2

(51) Int. Cl.
G01D 5/16 (2006.01)
(52) U.S. Cl.
CPC ...................................... G01D 5/16 (2013.01)
(58) Field of Classification Search
CPC ........................................................ G01D 5/16
See application file for complete search history.

(56) References Cited

U.S. PATENT DOCUMENTS

| 6,486,663 B1 | 11/2002 | Steinlechner |
| 2018/0238711 A1 | 8/2018 | Zimmer |
| 2018/0245948 A1* | 8/2018 | Huber Lindenberger ................... G01D 5/24471 |

FOREIGN PATENT DOCUMENTS

| CN | 102680916 A | 9/2012 |
| CN | 103444059 A | 12/2013 |
| CN | 104655004 A | 5/2015 |

(Continued)

OTHER PUBLICATIONS

Second Office Action in counterpart Chinese Patent Application No. 201911340528.2, dated Feb. 3, 2021.
(Continued)

*Primary Examiner* — Walter L Lindsay, Jr.
*Assistant Examiner* — Milton Gonzalez
(74) *Attorney, Agent, or Firm* — Westbridge IP LLC

(57) ABSTRACT

Disclosed is a magnetic encoder, a method and system for detecting an absolute electrical angle, and a readable storage medium. The magnetic encoder includes a magnetoresistance sensor, a magnetic field auxiliary coil and a coil current control circuit electrically connected with the magnetic field auxiliary coil, the magnetoresistance sensor being a planar component, the coil current control circuit being configured to supply current to the magnetic field auxiliary coil, to allow the magnetic field auxiliary coil to generate an auxiliary magnetic field, the auxiliary magnetic field influencing the magnetic field component in the first direction and the magnetic field component in the second direction, forming a resultant magnetic field, and the magnetoresistance sensor being configured to detect the resultant magnetic field and the component of the 2-dimension magnetic field generated by the magnet.

10 Claims, 8 Drawing Sheets

---

Acquiring the second voltage signal detected by the magnetic encoder of the two-dimension magnetic field component of the magnetic field of the magnet, the second voltage signal comprising an angular sinusoidal signal and an angular cosine signal — S210

▼

Calculating a scaling compensation sinusoidal signal and a scaling compensation cosine signal, according to the angular sinusoidal signal, the angular cosine signal and a scaling compensation formula — S220

▼

Calculating and obtaining the relative electric angle value according to the scaling compensation sinusoidal signal and the scaling compensation signal — S230

(56) References Cited

FOREIGN PATENT DOCUMENTS

| | | | |
|---|---|---|---|
| CN | 205484398 U | 8/2016 |
| CN | 106063097 A | 10/2016 |
| CN | 109714059 A | 5/2019 |
| CN | 110132124 A | 8/2019 |
| JP | 2005201657 A | 7/2005 |
| JP | 2005300216 A | 10/2005 |

OTHER PUBLICATIONS

First Office Action in counterpart Chinese Patent Application No. 201911340528.2, dated Oct. 20, 2020.
International Search Report and Written Opinion in counterpart PCT Application No. PCT/CN2019/130648, dated Sep. 24, 2020.

\* cited by examiner

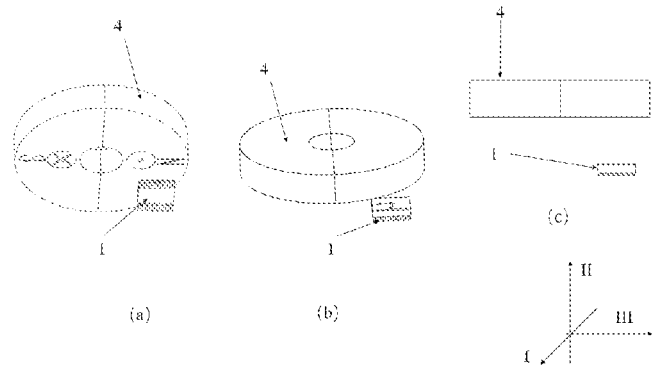

Fig. 9

| Controlling a magnetic field auxiliary coil to generate an auxiliary magnetic field influencing the magnetic component in the first direction and the magnetic component in the second direction and forming a mutual magnetic field, acquiring a first voltage signal of the mutual magnetic field detected by the magnetic encoder, and determining an angular position of the magnetic encoder according to the first voltage signal | S100 |
|---|---|

| Acquiring a second voltage signal detected by the magnetic encoder of the two-dimension magnetic field component of the magnetic field of the magnet, and calculating and obtaining a relative electric angle value according to the second voltage signal and an inverse trigonometric formula | S200 |
|---|---|

| Calculating the absolute electrical angle according to the angular position of the magnetic encoder and the relative electrical angle value | S300 |
|---|---|

Fig. 10

MAGNETIC ENCODER, METHOD, SYSTEM FOR DETECTING ABSOLUTE ELECTRICAL ANGLE, AND READABLE STORAGE MEDIUM

CROSS-REFERENCE TO RELATED APPLICATIONS

The present disclosure claims the benefits of and priority to Chinese Patent Application No. 201911340528.2, filed on Dec. 23, 2019, the entire disclosure of which is hereby incorporated by reference, in its entirety, for all that it teaches and for all purpose.

TECHNICAL FIELD

The present disclosure relates to the technical field of electromagnetic structures and signal processing, in particular to a magnetic encoder, a method and system for detecting an absolute electrical angle, and a readable storage medium.

BACKGROUND

The technologies have been applied that take magnetic encoders with magnetoresistance sensor chips (MR) and anisotropic magnetoresistance sensor chips (AMR) for detecting an angular position in a variety of control systems. These magnetic encoders detect the magnetic field components of the measured rotating magnetic field in a tangential-axial plane, a tangential-radial plane, or a radial-axial plane, and output voltage signals. However, the MR and AMR sensors are only sensitive to the magnitude of the magnetic field, but not to its polarity. When the magnetic field of the magnet rotates 360 degrees regarding its electrical angle, i.e., when the magnetic field changes for one entire period, the output signal of the magnetoresistance sensor may change for two periods. Therefore, the signal of the magnetoresistance sensor is not the absolute electrical angle signal of the magnetic field to be measured. Namely, the existing magnetic encoder cannot measure the absolute electrical angle of the magnet to be tested.

SUMMARY

The main purpose of the present disclosure is to provide a magnetic encoder, a method and a system of detecting an absolute electrical angle, and a readable storage medium, to improve the measurement accuracy of the absolute electrical angle of the magnet to be tested.

In order to achieve the above object, the present disclosure provides a magnetic encoder configured to detect components of a 2-dimension magnetic field generated by a magnet to be tested, and the components of the 2-dimension magnetic field include a magnetic field component in Z direction which is perpendicular to the surface of the chip, and a magnetic field component in a direction which is parallel to the surface of the chip, and the chip is packaged with surface mount technology (SMT); or the components of the 2-dimension magnetic field include a magnetic field component in a first direction and a magnetic field component in a second direction, in which the first direction and the second direction are orthogonal. The magnetic encoder includes a magnetoresistance sensor, a magnetic field auxiliary coil and a coil current control circuit electrically connected with the magnetic field auxiliary coil, the magnetoresistance sensor being a planar component, the coil current control circuit being configured to supply current to the magnetic field auxiliary coil, to allow the magnetic field auxiliary coil to generate an auxiliary magnetic field, the auxiliary magnetic field influencing the magnetic field component in the first direction and the magnetic field component in the second direction and forming a resultant magnetic field, and the magnetoresistance sensor being configured to detect the resultant magnetic field and the component of the 2-dimension magnetic field generated by the magnet.

Preferably, the magnetic field auxiliary coil includes a first coil and a second coil that are arranged in parallel, the first coil and the second coil being located in a same plane; the coil current control circuit is electrically connected with both of the first coil and the second coil, and configured to supply current to the first coil and the second coil and control a direction of the current in the first coil and in the second coil, and generate an auxiliary magnetic field influencing the magnetic components in the first direction and the second direction.

Preferably, the magnetic field auxiliary coil includes a fourth coil and two paralleled third coils; the coil current control circuit is electrically connected with both of the two third coils and the fourth coil, and configured to supply a current to the two third coils and control a direction of the current to generate a first interfering magnetic field to influence the magnetic field component in the first direction; the coil current control circuit is further configured to supply a current to the fourth coil and control a direction of the current to generate a second interfering magnetic field to influence the magnetic field component in the second direction, and the first interfering magnetic field and the second interfering magnetic field interacting to form the auxiliary magnetic field.

The present disclosure further provides a method for detecting an absolute electric angle based on the magnetic encoder, wherein the magnetic encoder is configured to detect a 2-dimension magnetic field component of a magnetic field generated by a magnet to be tested, and the 2-dimension magnetic field components including a magnetic field component in a first direction and a magnetic field component in a second direction. the method includes:

controlling a magnetic field auxiliary coil to generate an auxiliary magnetic field influencing the magnetic field component in the first direction and the magnetic field component in the second direction and forming a resultant magnetic field, acquiring a first voltage signal of the resultant magnetic field detected by the magnetic encoder, and determining an angular position of the magnetic encoder according to the first voltage signal;

acquiring a second voltage signal detected by the magnetic encoder of the 2-dimension magnetic field component of the magnetic field of the magnet, and calculating and obtaining a relative electric angle value according to the second voltage signal and an inverse trigonometric formula;

calculating the absolute electrical angle according to the angular position of the magnetic encoder and the relative electrical angle value.

Preferably, the operation of acquiring a second voltage signal detected by the magnetic encoder of the 2-dimension magnetic field component of the magnetic field of the magnet, and calculating and obtaining a relative electric angle value according to the second voltage signal and an inverse trigonometric formula, comprises:

acquiring the second voltage signal detected by the magnetic encoder of the 2-dimension magnetic field component of the magnetic field of the magnet, the second voltage signal comprising an angular sinusoidal signal and an angular cosine signal;

calculating a scaling compensation sinusoidal signal and a scaling compensation cosine signal, according to the angular sinusoidal signal, the angular cosine signal and a scaling compensation formula;

calculating and obtaining the relative electric angle value according to the scaling compensation sinusoidal signal and the scaling compensation signal, the scaling compensation formula being $$\begin{cases} V_{sc}(\theta) = [V_s(\theta) - V_{s0}] \cdot V_m / V_{sm} \\ V_{cc}(\theta) = [V_c(\theta) - V_{c0}] \cdot V_m / V_{cm} \end{cases},$$

in which $V_{sc}(\theta)$ is a scaling compensation sinusoidal signal; $V_{cc}(\theta)$ is a scaling compensation cosine signal; $V_s(\theta)$ is an angular sinusoidal signal, $V_c(\theta)$ is an angular cosine signal; $V_{s0}$ is a bias error of a preset sinusoidal signal; $V_{c0}$ is a bias error of a preset cosine signal; $V_m$ is a preset adjusting amplitude, $V_{sm}$ is an amplitude compensation to a fundamental wave of the preset sinusoidal signal, and $V_{cm}$ is an amplitude compensation to the fundamental wave of the preset cosine signal.

Preferably, the method further includes:

acquiring a periodic voltage signal detected by the magnetic encoder in response to the magnet rotating 360 degrees;

substituting the periodic voltage signal into error calculation formulas to obtain biases and amplitude compensations of the voltage signal, and respectively storing the obtained biases as the bias error of the preset sinusoidal signal $V_{s0}$, and the bias error of the preset cosine signal $V_{c0}$, storing the obtained amplitude compensations as the amplitude compensation to the fundamental wave of the preset sinusoidal signal $V_{sm}$, and the amplitude compensation to the fundamental wave of the preset cosine signal $V_{cm}$;

a bias error calculation formula being $$\begin{cases} V_{s0} = \frac{1}{2N\pi} \int_0^{2N\pi} V_s(\theta_e) d\theta_e \\ V_{c0} = \frac{1}{2N\pi} \int_0^{2N\pi} V_c(\theta_e) d\theta_e \end{cases},$$

an amplitude compensation calculation formula being $$\begin{cases} V_{sm} = \frac{1}{N\pi} \int_0^{2N\pi} V_s(\theta_e) \cdot \mathrm{Sin}(\theta_e) d\theta_e \\ V_{cm} = \frac{1}{N\pi} \int_0^{2N\pi} V_c(\theta_e) \cdot \mathrm{Cos}(\theta_e) d\theta_e \end{cases},$$

in which N is a number of periods of the periodic signal, $\theta_e$ is an electrical angle of a rotor, $V_s0$ is the bias error of the preset sinusoidal signal, $V_{c0}$ is the bias error of the preset cosine signal, $V_s(\theta)$ is the sinusoidal signal of the periodic voltage signal, $V_c(\theta)$ is the cosine signal of the periodic voltage signal, $V_{sm}$ is the amplitude compensation to the fundamental wave of the preset sinusoidal signal; and $V_{cm}$ is the amplitude compensation to the fundamental wave of the preset cosine signal.

Preferably, the operation of calculating the absolute electrical angle according to the angular position of the magnetic encoder and the relative electrical angle value, comprises:

determining a polarity position of the magnetic encoder relative to the magnet to be tested, according to the angular position;

in response to the polarity position being that the magnetic encoder is positioned at the N pole of the magnet, calculating and obtaining the absolute electric angle according to a first angular calculation formula;

in response to the polarity position being that the magnetic encoder is positioned at the S pole of the magnet, calculating and obtaining the absolute electric angle according to a second angular calculation formula;

in which, the first angular calculation formula is $\theta=\theta_c/2$; the second angular calculation formula is $\theta=\theta_c/2+180°$, $\theta$ being an absolute electrical angle, and $\theta_c$ being a relative electrical angle value.

Preferably, the operation of controlling a magnetic field auxiliary coil to generate an auxiliary magnetic field influencing the magnetic field component in the first direction and the magnetic field component in the second direction and forming a resultant magnetic field, acquiring a first voltage signal of the resultant magnetic field detected by the magnetic encoder, and determining an angular position of the magnetic encoder according to the first voltage signal, includes:

powering a forward current to the magnetic field auxiliary coil to generate an auxiliary magnetic field, the auxiliary magnetic field influencing the magnetic field component in the first direction and the magnetic field component in the second direction in a forward direction, acquiring a first two-path signal of the resultant magnetic field detected by the magnetic encoder, and calculating a first polarity relative electric angles $\theta_{ct+}$ and $\theta_{ca+}$, according to the first two-path signal, an inverse trigonometry formula and the scaling compensation formula;

powering a reverse current to the magnetic field auxiliary coil to generate an auxiliary magnetic field, the auxiliary magnetic field influencing the magnetic field component in the first direction and the magnetic field component in the second direction in a reverse direction, acquiring a second two-path signal of the resultant magnetic field detected by the magnetic encoder, and calculating a second polarity relative electric angles $\theta_{ct-}$ and $\theta_{ca-}$, according to the second two-path signal, an inverse trigonometry formula and the scaling compensation formula;

determining the angular position according to a relationship between the relative electrical angle value $\theta_c$ and the first polarity relative electrical angles $\theta_{ct+}$ and $\theta_{ca+}$, and/or a relationship between the relative electrical angle value $\theta_c$ and the second polarity relative electrical angles $\theta_{ct-}$ and $\theta_{ca-}$.

The present disclosure further provides a system of detecting an absolute electrical angle. The system includes a magnetic encoder and a control device, the control device including a processor, a memory, and a program stored on the memory and executable by the processor, configured to detect the absolute electrical angle. Operations of the method as described above are implemented, when the program is executed by the processor.

The present disclosure further provides a computer readable storage medium on which a program for detecting an absolute electrical angle is stored. When the program for detecting an absolute electrical angle is executed by the processor, the operations of the absolute electrical angle detection method as described above are implemented.

The technical solution of the present disclosure lies in that the magnetoresistance sensor is convenient to install as a planar component. The arrangement of the magnetic field auxiliary coil aims to generate an auxiliary magnetic field which can be felt by the magnetoresistance sensor so as to influence the components of the 2-dimension magnetic field of the magnet. The angle detected by the magnetoresistance sensor is thus affected. When current is introduced to the magnetic field auxiliary coil, the polarity can be judged that whether the magnetoresistance sensor faces the N pole or the S pole of the magnet to be measured from the angle change of the magnetoresistance sensor. The absolute electric angle of the magnet to be tested can be calculated according to the position of the magnet to be measured and the output voltage detected by the magnetoresistance sensor.

BRIEF DESCRIPTION OF THE DRAWINGS

FIG. 9 is a schematic structural diagram of the magnet to be tested and magnetic encoder.

FIG. 10 is a block diagram of a method of detecting the absolute electrical angle according to a first embodiment of the present disclosure.

The implementation, functional features and advantages of the present application will be further described with reference to the accompanying drawings with the embodiment.

DETAILED DESCRIPTION OF THE EMBODIMENTS

It should be understood that the specific embodiments described herein are only for the purpose of explaining the present application and are not intended to limit the present application.

The method related to the illustrative embodiment of the present disclosure of detecting an absolute electrical angle is mainly applied to a system for detecting an absolute electrical angle of rotor magnet. The system includes a magnetic encoder, a system controller and a memory.

Figure 1:
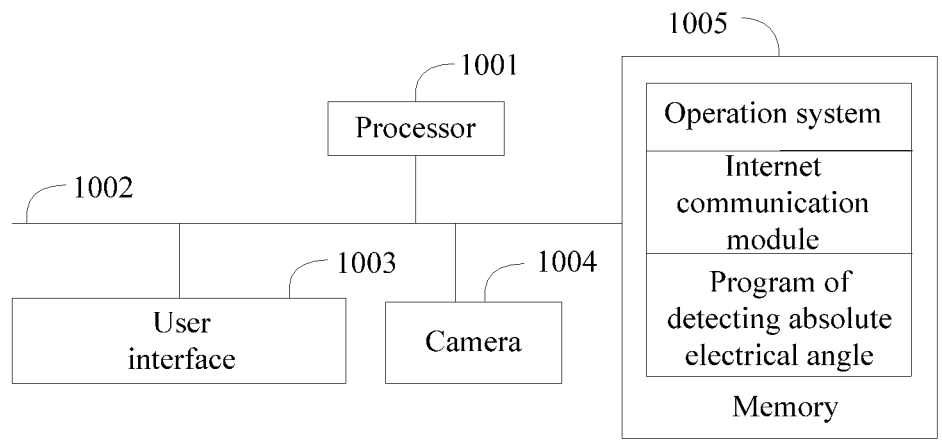
FIG. 1 is a schematic diagram of a system hardware according to an embodiment of the present disclosure.

Referring to FIG. 1, which is a system hardware according to an embodiment of the present disclosure, in an embodiment of the present disclosure, the controller may include a processor 1001 (e.g., CPU), a communication bus 1002, a user interface 1003, a network interface 1004, and a memory 1005. The communication bus 1002 is configured to realize communication between these components. The user interface 1003 may include a display panel, an input unit such as a keyboard. The network interface 1004 may optionally include a standard wired interface, a wireless interface (such as a Wi-Fi interface). The memory 1005 may be a high-speed RAM memory or a non-volatile memory such as a magnetic disk memory, and the memory 1005 may optionally be a storage device independent of the aforementioned processor 1001. The light sensor 1006 is electrically connected to the processor 1001 through the communication bus 1002.

Optionally, the controller may further include a camera, a radio frequency circuit, a sensor, an audio circuit, a Wi-Fi module, and the like. Sensors can be light sensors, motion sensors and other sensors. Specifically, the light sensor may include an ambient light sensor and a proximity sensor. The ambient light sensor may adjust the brightness of the display screen according to the brightness of ambient light, and the proximity sensor may turn off the display screen and/or backlight when the mobile controller moves close to the ear. As a motion sensor, the gravity acceleration sensor can detect the magnitude of acceleration in all directions (generally in three dimensions) and the magnitude and direction of gravity at still. It can be configured to identify the postures of the motion controller (including horizontal and vertical screen switching, related games, magnetometer posture calibration), vibration identification related functions (including pedometer, tapping), etc. The mobile controller can definitely further be equipped with other sensors including gyroscopes, barometers, hygrometers, thermometers, infrared sensors and the like, which will not be detailed herein.

It would be appreciated by those skilled in the art that the structure shown in FIG. 1 does not constitute a limitation to the device, which may include more or fewer components than shown, or some components may be combined, or different components arranged.

Referring again to FIG. 1, the memory 1005 as a computer readable storage medium in FIG. 1 may include an operating system, a network communication module, and a program for detecting the absolute electrical angle detection.

In FIG. 1, the network communication module is mainly configured to connect and communicate data with the server. The processor 1001 can call the program stored in the memory 1005 for detecting the absolute electrical angle and perform the following operations:

controlling a magnetic field auxiliary coil of the magnetic encoder to generate an auxiliary magnetic field which influences the magnetic field component in the first direction and the magnetic field component in the second direction, the components of the 2-dimension magnetic field of the magnet to be tested and the auxiliary magnetic field forming a resultant magnetic field;

controlling a magnetic field auxiliary coil to generate an auxiliary magnetic field influencing the magnetic field component in the first direction and the magnetic field component in the second direction and forming a resultant magnetic field, acquiring a first voltage signal of the resultant magnetic field detected by the magnetic encoder, and determining an angular position of the magnetic encoder according to the first voltage signal;

acquiring a second voltage signal detected by the magnetic encoder of the 2-dimension magnetic field component of the magnetic field of the magnet, and calculating and obtaining a relative electric angle value according to the second voltage signal and an inverse trigonometric formula;

calculating the absolute electrical angle according to the angular position of the magnetic encoder and the relative electrical angle value.

Further, the processor 1001 may call the program of detecting the absolute electrical angle stored in the memory 1005 and perform the following operations:

acquiring the second voltage signal detected by the magnetic encoder of the 2-dimension magnetic field component of the magnetic field of the magnet, the second voltage signal comprising an angular sinusoidal signal and an angular cosine signal;

calculating a scaling compensation sinusoidal signal and a scaling compensation cosine signal, according to the angular sinusoidal signal, the angular cosine signal and a scaling compensation formula;

calculating and obtaining the relative electric angle value according to the scaling compensation sinusoidal signal and the scaling compensation signal.

The scaling compensation formula is $$\begin{cases} V_{sc}(\theta) = [V_s(\theta) - V_{s0}] \cdot V_m / V_{sm} \\ V_{cc}(\theta) = [V_c(\theta) - V_{c0}] \cdot V_m / V_{cm} \end{cases},$$

in which $V_{sc}(\theta)$ is a scaling compensation sinusoidal signal; $V_{cc}(\theta)$ is a scaling compensation cosine signal; $V_s(\theta)$ is an angular sinusoidal signal, $V_c(\theta)$ is an angular cosine signal; $V_s0$ is a bias error of a preset sinusoidal signal; $Vc0$ is a bias error of a preset cosine signal; $V_m$ is a preset adjusting amplitude, $V_{sm}$ is an amplitude compensation to a fundamental wave of the preset sinusoidal signal, and $V_{cm}$ is an amplitude compensation to the fundamental wave of the preset cosine signal.

Further, the processor 1001 may call the program of detecting the absolute electrical angle stored in the memory 1005 and perform the following operations:

acquiring a periodic voltage signal detected by the magnetic encoder in response to the magnet rotating 360 degrees;

substituting the periodic voltage signal into error calculation formulas to obtain biases and amplitude compensations of the voltage signal, and respectively storing the obtained biases as the bias error of the preset sinusoidal signal $V_{s0}$, and the bias error of the preset cosine signal $V_{c0}$, storing the obtained amplitude compensations as the amplitude compensation to the fundamental wave of the preset sinusoidal signal $V_{sm}$, and the amplitude compensation to the fundamental wave of the preset cosine signal $V_{cm}$;

a bias error calculation formula being $$\begin{cases} V_{s0} = \dfrac{1}{2N\pi} \int_0^{2N\pi} V_s(\theta_e) d\theta_e \\ V_{c0} = \dfrac{1}{2N\pi} \int_0^{2N\pi} V_c(\theta_e) d\theta_e \end{cases},$$

an amplitude compensation calculation formula being $$\begin{cases} V_{sm} = \dfrac{1}{N\pi} \int_0^{2N\pi} V_s(\theta_e) \cdot \mathrm{Sin}(\theta_e) d\theta_e \\ V_{cm} = \dfrac{1}{N\pi} \int_0^{2N\pi} V_c(\theta_e) \cdot \mathrm{Cos}(\theta_e) d\theta_e \end{cases},$$

in which N is a number of periods of the periodic signal, $\theta_e$ is the electrical angle of a rotor, $V_{s0}$ is the bias error of the preset sinusoidal signal, $V_{c0}$ is the bias error of the preset cosine signal, $V_s(\theta)$ is the sinusoidal signal of the periodic voltage signal, $V_c(\theta)$ is the cosine signal of the periodic voltage signal, $V_{sm}$ is the amplitude compensation to the fundamental wave of the preset sinusoidal signal; and $V_{cm}$ is the amplitude compensation to the fundamental wave of the preset cosine signal.

Further, the processor 1001 may call the program of detecting the absolute electrical angle stored in the memory 1005 and perform the following operations:

determining a polarity position of the magnetic encoder relative to the magnet to be tested, according to the angular position;

in response to the polarity position being that the magnetic encoder is positioned at the N pole of the magnet, calculating and obtaining the absolute electric angle according to a first angular calculation formula;

in response to the polarity position being that the magnetic encoder is positioned at the S pole of the magnet, calculating and obtaining the absolute electric angle according to a second angular calculation formula;

wherein, the first angular calculation formula is $\theta=\theta_c/2$; the second angular calculation formula is $\theta=\theta_c/2+180°$, $\theta$ being an absolute electrical angle, and $\theta c$ being a relative electrical angle value.

Further, the processor 1001 may call the program of detecting the absolute electrical angle stored in the memory 1005 and perform the following operations:

powering a forward current to the magnetic field auxiliary coil to generate an auxiliary magnetic field, the auxiliary magnetic field influencing the magnetic field component in the first direction and the magnetic field component in the second direction in a forward direction, acquiring a first two-path signal of the resultant magnetic field detected by the magnetic encoder, and calculating a first polarity relative electric angles $\theta_{ct+}$ and $\theta_{ca+}$, according to the first two-path signal, an inverse trigonometry formula and the scaling compensation formula;

powering a reverse current to the magnetic field auxiliary coil to generate an auxiliary magnetic field, the auxiliary magnetic field influencing the magnetic field component in the first direction and the magnetic field component in the second direction in a reverse direction, acquiring a second two-path signal of the resultant magnetic field detected by the magnetic encoder, and calculating a second polarity relative electric angles $\theta_{ct-}$ and $\theta_{ca-}$, according to the second two-path signal, an inverse trigonometry formula and the scaling compensation formula;

determining the angular position according to a relationship between the relative electrical angle value $\theta_c$ and the first polarity relative electrical angles $\theta_{ct+}$ and $\theta_{ca+}$, and/or a relationship between the relative electrical angle value $\theta_c$ and the second polarity relative electrical angles $\theta_{ct-}$ and $\theta_{ca-}$.

Based on the aforementioned hardware structure of the controller, various embodiments of the present disclosure are proposed regarding method of detecting the absolute electrical angle.

In the present disclosure, the magnetoresistance sensor is configured to detect a 2-dimension magnetic field, which can be a tangential-axial magnetic component of the magnet to be tested, a radial-tangential magnetic component of the magnet to be tested, or a radial-axial magnetic component of the magnet to be tested. For convenience of description, in the following embodiments of the present disclosure, the 2-dimension magnetic field is an axial-tangential magnetic component for illustration. It should be appreciated by those skilled in the art that when the radial-tangential magnetic component or the radial-axial magnetic component is detected, the detection plane of the magnetoresistance sensor should be adjusted to a same plane as the magnetic component to be detected is in. and adaptively adjusting the relative positional relationship between the magnetic field auxiliary coil and the magnet to be tested and the direction of introducing current according to the winding direction and the relative positional relationship of the magnetic field auxiliary coil. For describing convenience, in the following embodiments of the present disclosure, tangential magnetic field, axial magnetic field and radial magnetic field, respectively represent tangential magnetic component distribution, axial magnetic component distribution and radial magnetic component distribution in the magnetic field, rather than any independent existing magnetic fields.

Figure 14:
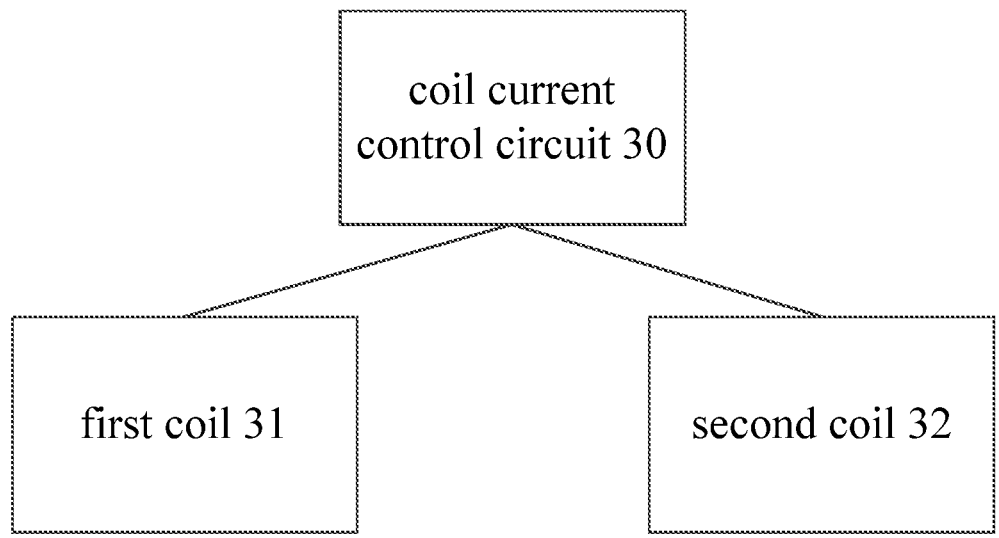
FIG. 14 is a schematic structural diagram of the coil current control circuit of the present disclosure.

Referring to FIGS. 2 to 8, in some embodiment of the present disclosure, the magnetic encoder 1 is configured to detect a component of a 2-dimension magnetic field generated by a magnet to be tested, the component of the 2-dimension magnetic field includes a magnetic field component in a first direction and a magnetic field component in a second direction. The magnetic encoder 1 includes a magnetoresistance sensor 2, a magnetic field auxiliary coil (not shown) and a coil current control circuit 30 (shown in FIG. 14) electrically connected with the magnetic field auxiliary coil. The magnetoresistance sensor 2 being a planar component, the coil current control circuit 30 being configured to supply current to the magnetic field auxiliary coil, to allow the magnetic field auxiliary coil to generate an auxiliary magnetic field. The auxiliary magnetic field influences the magnetic field component in the first direction and the magnetic field component in the second direction and forming a resultant magnetic field with the components of the 2-dimension magnetic field. The magnetoresistance sensor is configured to detect the resultant magnetic field and the component of the 2-dimension magnetic field generated by the magnet.

In present embodiment, the magnetoresistance sensor is a planar component, and the magnetoresistance sensor and the magnetic field auxiliary coil are stacked. The magnetoresistance sensor is configured to detect a 2-dimension magnetic field. Namely, the 2-dimension may refer to the tangential and axial directions of the magnet to be measured, the radial and tangential directions of the magnet to be measured, and the radial and axial directions of the magnet to be measured. In the present embodiment, the magnetic field component in the first direction and the magnetic field component in the second direction can be tangential magnetic component and axial magnetic component respectively.

The magnetoresistance sensor can be an MR sensor, or an AMR sensor, or giant-magnetoresistance sensor, or tunnel-magnetoresistance sensor, or other magnetic sensor, and the plane formed by the axial magnetic component and the tangential magnetic component of the magnet 4 is parallel to the detecting surface of the magnetoresistance sensor 2. The magnetic field auxiliary coil can generate an auxiliary magnetic field to influence the tangential magnetic component and the axial magnetic component of the magnet 4 to form a resultant magnetic field. When current flows through the magnetic field auxiliary coil, the generated magnetic field affects the magnetic field of the original magnet. And the magnetoresistance sensor 2 may detect the change in the angle of the magnet to be tested. As the angle changes detected by the N pole and the S pole are different if a specific pole faces the magnetoresistance sensor 2, the polarity of the magnetic field to be measured can be determined according to the change of the angle of the magnetic field to be measured. Namely, it can be determined that the magnetic pole is the N pole or the S pole of the magnet facing the magnetoresistance sensor 2. As shown in FIG. 9, the position of the magnetic encoder 1 is opposite to that of the magnet 4 to be measured. In the coordinate system of FIG. 9(c), the direction I is tangential, the direction II is axial, and the direction III is radial. The magnet 4 is a rotor, and the magnetoresistance sensor 2 and the magnetic field auxiliary coil can be separate devices or devices integrated together. In some embodiment, the magnetic field auxiliary coil is implemented by a PCB. In another embodiment, the magnetic field auxiliary coil is arranged on the package base of the magnetoresistance sensor 2. In yet another embodiment, the magnetoresistance sensor 2 is integrated with the magnetic field auxiliary coil to form a total chip, which can simplify the structure of the magnetic encoder 1 and reduce the PCB area required by the detecting circuit, thus simplifying the installation and debugging of the detecting circuit.

When there is one pair of magnetic poles in the magnet 4 to be measured, the magnetoresistance sensor 2 can be configured to detect the axial magnetic component and the tangential magnetic component of the magnet 4 to be measured. The absolute mechanical angle position of the rotor can also be calculated by the magnetic field of the auxiliary coil and the signal processing technology. When there is more than one pair of magnetic pole in the magnet to be tested 4, the axial and tangential magnetic components of the magnetoresistance sensor 2 can be directly detected and the value of the relative electrical angle of the magnet to be tested 4 is calculated. Or the absolute electrical angle of the magnet 4 can be calculated using the influence of the magnetic field auxiliary coil on the magnetic field and the signal processing technology.

The technical solution of the present disclosure, lies in that the magnetoresistance sensor is convenient to install as a planar component. The arrangement of the magnetic field auxiliary coil aims to generate an auxiliary magnetic field which can be felt by the magnetoresistance sensor so as to influence the components of the 2-dimension magnetic field of the magnet. The angle detected by the magnetoresistance sensor is thus affected. When current is introduced to the magnetic field auxiliary coil, the polarity can be judged that whether the magnetoresistance sensor faces the N pole or the S pole of the magnet to be measured from the angle change of the magnetoresistance sensor. The relative electric angle, the absolute electric angle, as well as the absolute mechanical angle of the magnet to be tested can be calculated according to the position of the magnet to be measured and the output voltage detected by the magnetoresistance sensor.

Figure 2:
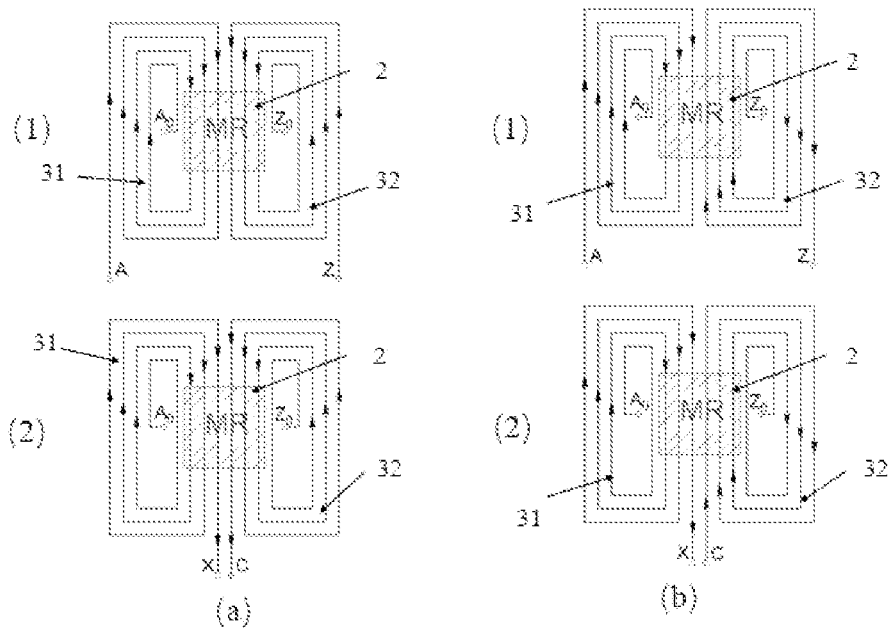
FIG. 2 is a schematic structural diagram of a magnetic encoder according to one embodiment of the present disclosure.

Referring to FIG. 2, the magnetic field auxiliary coil comprises a first coil 31 and a second coil 32 which are arranged in parallel. The first coil 31 and the second coil 32 are located in the same plane, and the coil current control circuit 30 is electrically connected with both the first coil 31 and the second coil 32. The coil current control circuit 30 is configured to supply current to the first coil 31 and the second coil 32 and control the direction of the currents of the first coil 31 and the second coil 32, and generate an auxiliary magnetic field influencing the magnetic components in the first direction and the second direction. When the current of the first coil 31 is clockwise and the current of the second coil 32 is counterclockwise, the magnetoresistance sensor 2 can sense the tangential magnetic component generated by the cooperation of the first coil 31 and the second coil 32; when the current of the first coil 31 and the current of the second coil 32 are both clockwise, the magnetoresistance sensor 2 can sense the axial magnetic component generated by the engagement of the first coil 31 and the second coil 32. In the present embodiment, the auxiliary effect of the tangential magnetic field and the axial magnetic field can be realized by changing the current relationship between the adjacent first coil 31 and the second coil 32, respectively. The first coil 31 and the second coil 32 may be single-layer coils or double-layer coils. When the first coil 31 and the second coil 32 are both double-layer coils, as shown in (a) of FIG. 2, the end $A_0$ of the winding AX located at the first layer (1) is connected with the end $A_0$ at the second layer (2). The end Zo of the winding CZ located at the first layer (1) and the end Zo at the second layer (2) are connected through connecting holes. In (a) of FIG. 2, the direction of the current of the winding AX is clockwise, and that of CZ is counter-clockwise. As such, the influence of the winding magnetic field on MR is in the tangential direction. In (b) of FIG. 2, the direction of the current of the winding AX is still clockwise, but that of CZ is further clockwise. As such, the influence of the winding magnetic field on MR is in the axial direction.

Figure 3:
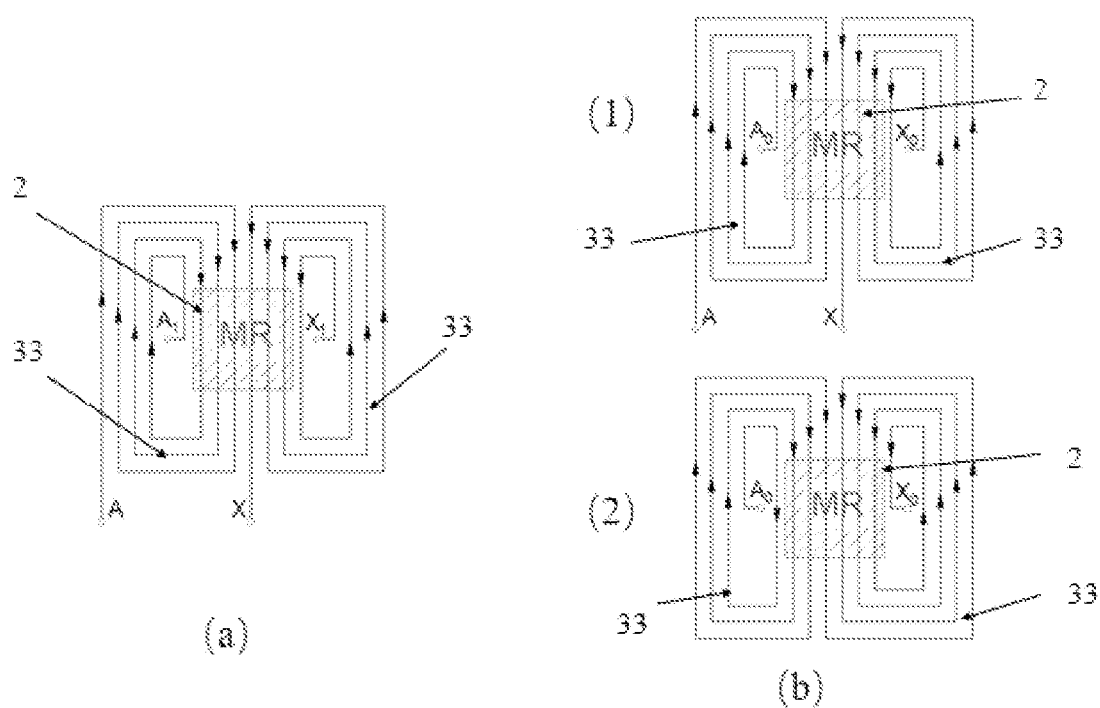
FIG. 3 is a schematic structural diagram of a magnetoresistance sensor and a third coil according to one embodiment of the present disclosure.
Figure 4:
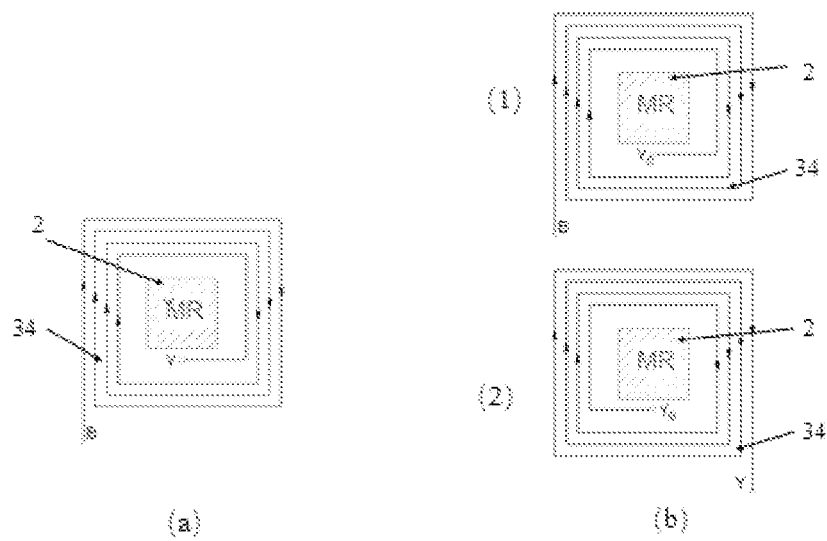
FIG. 4 is a schematic structural diagram of a magnetoresistance sensor and a fourth coil according to one embodiment of the present disclosure.
Figure 5:
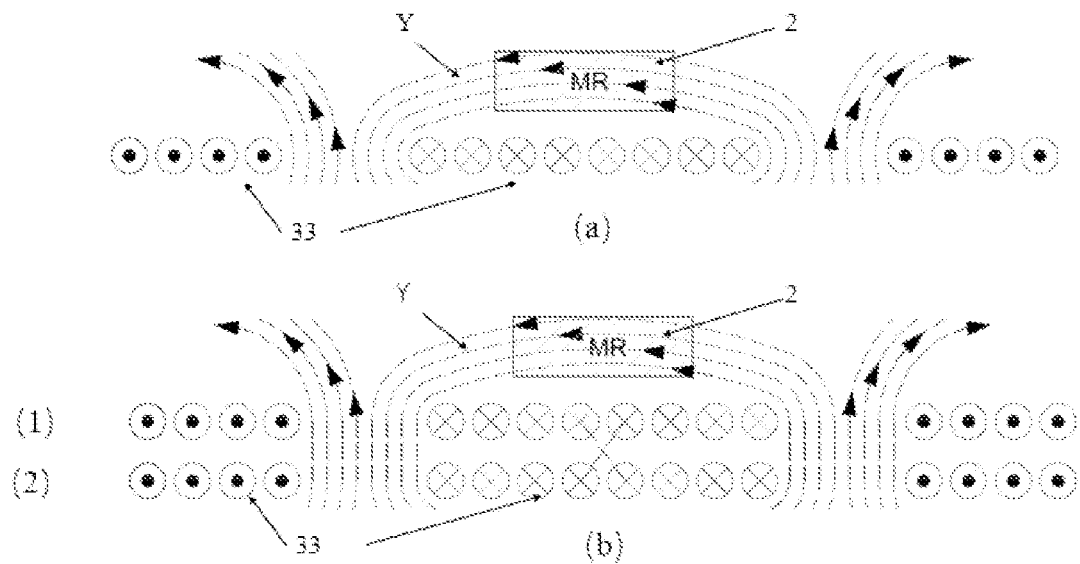
FIG. 5 is a schematic diagram of the magnetic field sensed by the magnetoresistance sensor under the third coil.
Figure 6:
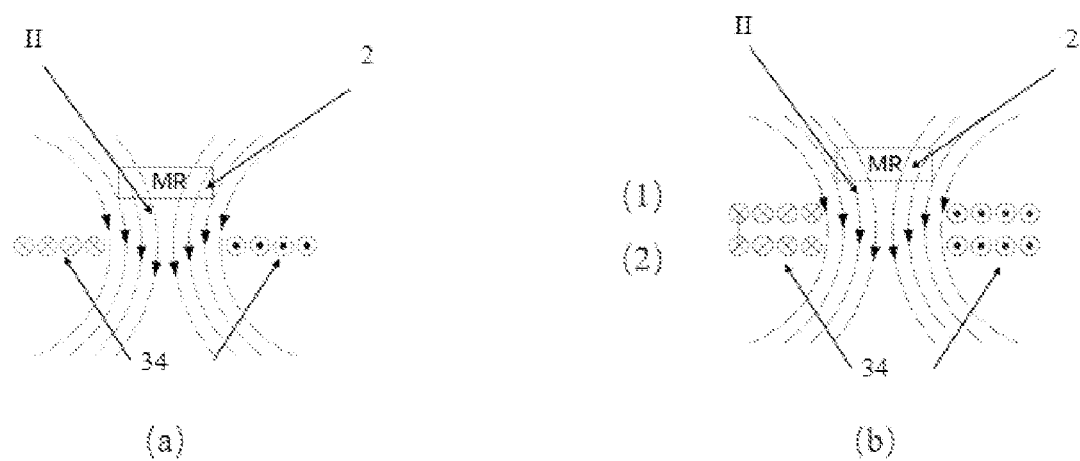
FIG. 6 is a schematic diagram of the magnetic field sensed by the magnetoresistance sensor under the fourth coil.

Further, please refer to FIGS. 3 and 4. In some other embodiment, the magnetic field auxiliary coil comprises a fourth coil 34 and two third coils 33 arranged in parallel. The coil current control circuit 30 is electrically connected with the two third coils 33 and the fourth coil 34 both. The coil current control circuit 30 is configured to supply a current to the two third coils and control a direction of the current to generate a first interfering magnetic field to influence the magnetic field component in the first direction; the coil current control circuit 30 is further configured to supply a current to the fourth coil and control a direction of the current to generate a second interfering magnetic field to influence the magnetic field component in the second direction, and the first interfering magnetic field and the second interfering magnetic field interacting to form the auxiliary magnetic field. The first interfering magnetic field affects the tangential magnetic component, and induces the tangential magnetic component to increase or decrease. The second interfering magnetic field affects the axial magnetic component, and induces the axial magnetic component to increase or decrease. In the present embodiment, the auxiliary effects of the tangential magnetic field and the axial magnetic field can be realized by the two third coils 33 and the fourth coil 34, respectively. The third coil 33 and the fourth coil 34 may be single-layer coils or double-layer coils.

As shown in (a) of FIG. 3, the third coil 33 is a single-layer coil in which A1 and X1 are electrically connected by jumpers. As shown in (b) of FIG. 3, the third coil 33 is a double-layer coil, and $A_0$ and $X_0$ at the first layer (1) are respectively electrically connected with $A_0$ and $X_0$ at the second layer (2) through connection holes. When the current flows from A to X respectively, the relationship between the magnetic field which is generated by the two coils illustrated in (a) and (b) of FIG. 3, and the magnetoresistance sensor 2 is shown in (a) and (b) of FIG. 5, respectively. No matter it is a single-layer coil or a double-layer coil, the induced magnetic component I at the position of the magnetoresistance sensor 2 is in the tangential direction. As shown in (a) of FIG. 4, the fourth coil 34 is a single-layer coil and external wires are connected between B and Y. As shown in (b) of FIG. 4, the fourth coil 34 is a double-layer coil, and $Y_0$ at the first layer (1) and $Y_0$ at the second layer (2) are electrically connected through connection holes. When the current flows from B to Y, the relationship between the magnetic field which is generated by the two coils illustrated in (a) and (b) of FIG. 4, and the magnetoresistance sensor 2 is shown in (a) and (b) of FIG. 5, respectively. No matter it is a single-layer coil or a double-layer coil, the induced magnetic component II at the position of the magnetoresistance sensor 2 is in the axial direction.

Figure 7:
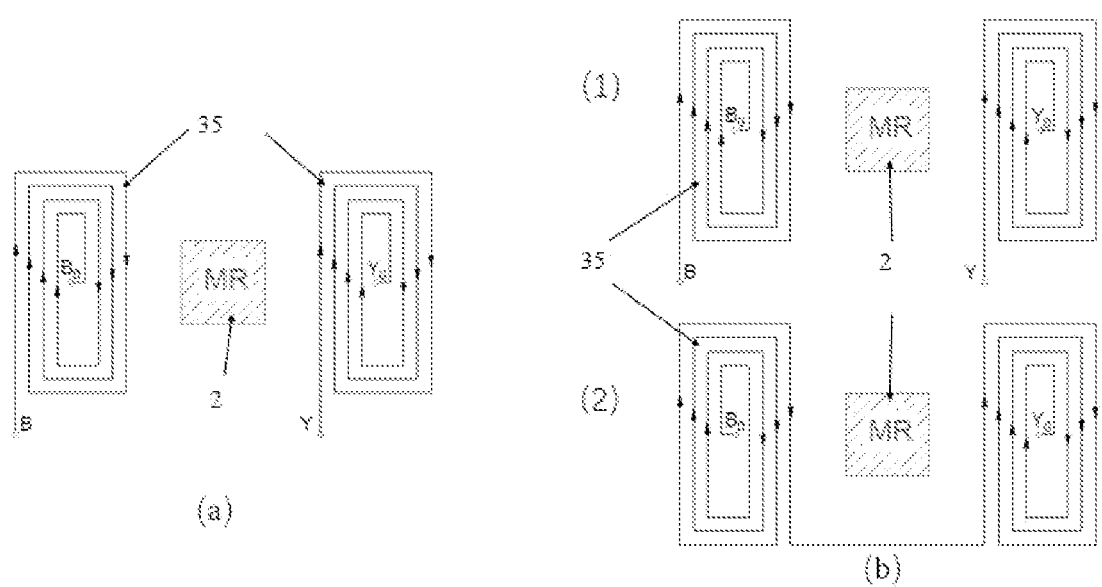
FIG. 7 is a schematic structural diagram of a magnetoresistance sensor and a fourth coil according to one embodiment of the present disclosure.

In addition, please refer to FIG. 7. In some other embodiment, the magnetic field auxiliary coil includes two fifth coils arranged in parallel and two sixth coils 35 arranged in parallel. The two fifth coils are in the same plane and the two sixth coils 35 are in the same plane. The coil current control circuit 30 is both electrically connected with the two fifth coils and the two sixth coils 35. The coil current control circuit 30 is configured to provide an inverse current to the two fifth coils to generate a tangential magnetic component relative to the magnetoresistance sensor 2. The coil current control circuit 30 is used to supply a co-current to the two sixth coils 35 to generate an axial magnetic component relative to the magnetoresistance sensor 2. The two fifth coils are arranged above or below the magnetoresistance sensor 2, and the two sixth coils 35 are arranged above or below the magnetoresistance sensor 2. The coil current control circuit 30 can cause the two fifth coils to generate the reverse current. As such, the magnetoresistance sensor 2 can sense the tangential magnetic component generated by the co-action of the two fifth coils. The two sixth coils 35 are respectively arranged below or above the magnetoresistance sensor 2, and the coil current control circuit 30 can supply the current in a same direction to the two sixth coils 35. As such, the magnetoresistance sensor 2 can sense the axial magnetic component generated by the two sixth coils 35. In the present embodiment, the auxiliary effects of the tangential magnetic component and the axial magnetic component can be realized by the two fifth coils and the two sixth coils 35, respectively. The fifth coil and the sixth coil 35 may be single-layer coils or double-layer coils.

Figure 8:
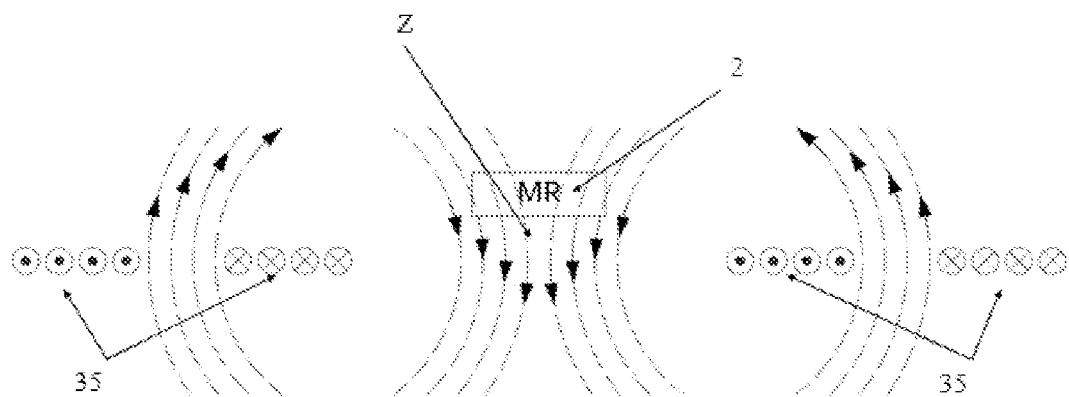
FIG. 8 is a schematic diagram of the magnetic field sensed by the magnetoresistance sensor under the sixth coil.

In which, the arrangement regarding the two fifth coils is the same as the arrangement of the two third coils 33 mentioned above, and will not be repeated herein. The arrangement of the two sixth coils 35 is shown in (a) and (b) of FIG. 7. The two sixth coils 35 form a double-sided coil, and B0 and Y0 can be realized by a single-layer coil shown in (a) of the FIG. 7 (a) or a double-layer coil shown in (b) of the FIG. 7. In part (b) of the FIG. 7, the ends $B_0$ and $Y_0$ at the first layer (1) are connected to the ends $B_0$ and $Y_0$ at the second layer (2) through connection holes, respectively. When current flows from B to Y respectively, FIG. 8 shows the magnetic field of the single-layer coil. The magnetic field sensed at the position of the magnetoresistance sensor 2 is in the axial direction.

The present disclosure further provides a method for detecting an absolute electrical angle, and FIG. 10 is referred to. In the first embodiment of the present disclosure, the absolute electrical angle detection method includes the following operations:

Operation S100, controlling a magnetic field auxiliary coil to generate an auxiliary magnetic field influencing the magnetic field component in the first direction and the magnetic field component in the second direction and forming a resultant magnetic field, acquiring a first voltage signal of the resultant magnetic field detected by the magnetic encoder, and determining an angular position of the magnetic encoder according to the first voltage signal.

The coil current control circuit controls the current and its direction flowing through the auxiliary magnetic field, so that the magnetic field auxiliary coil may generate an auxiliary magnetic field that affects the magnetic field component in the first direction and the magnetic field component in the second direction.

Specifically, the magnetic encoder is installed in the magnetic field area of the magnet to be tested. The angular position of the magnet to be tested is detected by the magnetic encoder described above, and the magnetic encoder may output a corresponding first voltage signal. As the magnetic field auxiliary coil can generate a magnetic field that affects the tangential magnetic component and the axial magnetic component, so that the sensor senses the change of the tangential and axial magnetic fields. Further, the influence of both axial magnetic field and the tangential magnetic field on the angle of the magnetoresistance sensor is different under the conditions of N-pole and S-pole magnetic fields. After obtaining the voltage signal of the magnet to be tested, the polarity of the magnet which the magnetoresistance sensor faces can be determined, according to the angle change of the magnetoresistance sensor.

Operation S200, acquiring a second voltage signal detected by the magnetic encoder of the 2-dimension magnetic field component of the magnetic field of the magnet, and calculating and obtaining a relative electric angle value according to the second voltage signal and an inverse trigonometric formula;

Specifically, the second voltage signal includes an angular sinusoidal signal and an angular cosine signal. The relative electrical angle value can be calculated according to the inverse trigonometric formula.

Operation S300, calculating the absolute electrical angle according to the angular position of the magnetic encoder and the relative electrical angle value.

The absolute electrical angle of the measured magnet can be calculated, followed by the determination of the angular position of the magnetic encoder and calculation of the relative electrical angle value.

In the technical solution of the present disclosure, the magnetic field is generated by the magnetic field auxiliary coil, and further change the tangential magnetic component and the axial magnetic component. These changes are sensed by the magnetoresistance sensor. As the influence of the tangential magnetic component and the axial magnetic component on the detection angle of the sensor are exactly different under the condition of N-pole and S-pole magnetic fields, when current is input into the magnetic field auxiliary coil, the polarity of the magnet to be tested which faces the magnetoresistance sensor can be determined according to the voltage signal output by the magnetic encoder, being whether it is the S pole or the N pole. According to the voltage signal output by the magnetic encoder, a calibration signal is obtained. An angle value is then calculated according to the calibration signal, followed by the calculation of the absolute electrical angle of the magnet to be measured according to the position of the magnet to be measured. Different formulas are selected with different positions of the magnet.

Figure 11:
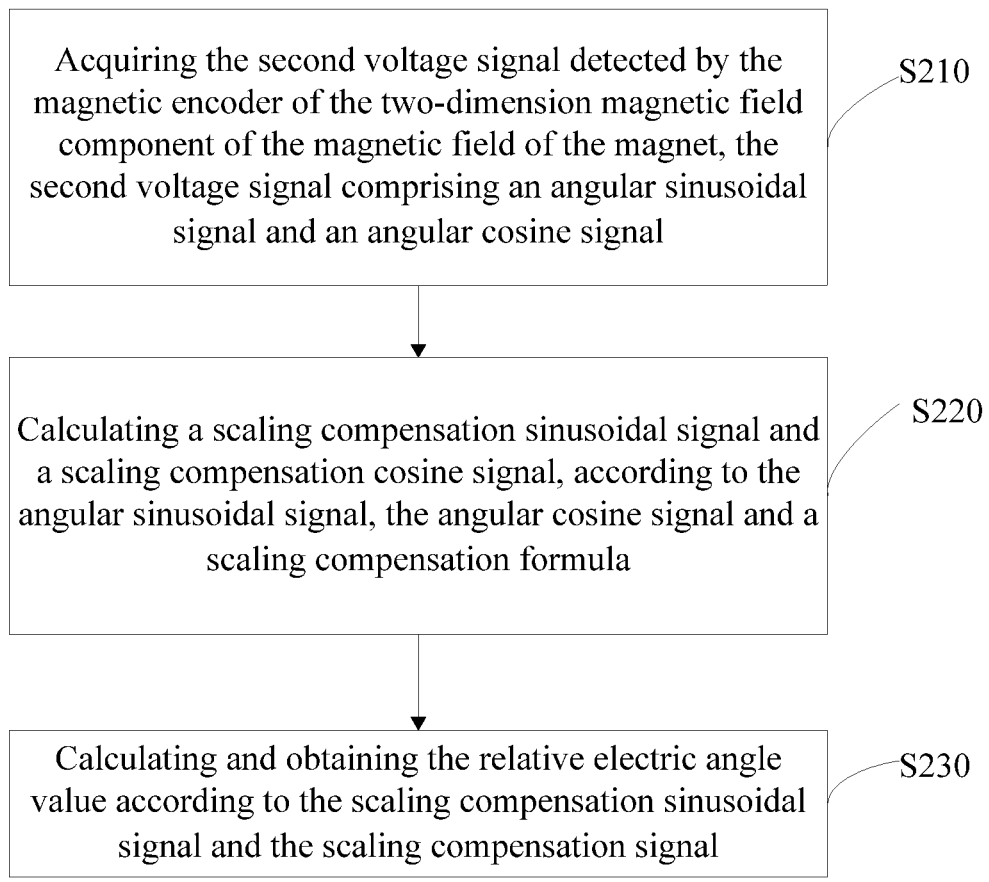
FIG. 11 is a detailed block diagram of the operation calculating and obtaining an absolute electrical angle by using the angle value according to a position of the magnetic encoder according to the present disclosure.

Please refer to FIG. 11, which is a detailed block diagram of a method of detecting the absolute electrical angle according to operation S200 in a second embodiment of the present disclosure. Based on the above embodiment, operation S200 includes:

Operation S210, acquiring the second voltage signal detected by the magnetic encoder of the 2-dimension magnetic field component of the magnetic field of the magnet, the second voltage signal comprising an angular sinusoidal signal and an angular cosine signal;

Operation S220, calculating a scaling compensation sinusoidal signal and a scaling compensation cosine signal, according to the angular sinusoidal signal, the angular cosine signal and a scaling compensation formula;

Operation S230, calculating and obtaining the relative electric angle value according to the scaling compensation sinusoidal signal and the scaling compensation signal.

In which, the scaling compensation formula being $$\begin{cases} V_{sc}(\theta) = [V_s(\theta) - V_{s0}] \cdot V_m / V_{sm} \\ V_{cc}(\theta) = [V_c(\theta) - V_{c0}] \cdot V_m / V_{cm} \end{cases},$$

wherein $V_{sc}(\theta)$ is a scaling compensation sinusoidal signal; $V_{cc}(\theta)$ is a scaling angular sinusoidal signal; $V_s(\theta)$ is a detected sinusoidal signal, $V_c(\theta)$ is an angular cosine signal; $V_{s0}$ is the bias of a preset sinusoidal signal; $V_{c0}$ is a bias of a preset cosine signal; $V_m$ is a preset adjusting amplitude, $V_{sm}$ is an amplitude compensation to a fundamental wave of the preset sinusoidal signal, and $V_{cm}$ is an amplitude compensation to the fundamental wave of the preset cosine signal.

Before each test or after the first power-up of the installation, the calibration process is performed in advance to preset biases in the controller, and the biases are obtained through the calibration process. After obtaining the detected voltage signal of the magnetic encoder, amplitude compensations $V_{sm}$ and $V_{cm}$ can be obtained of the fundamental wave of the sinusoidal signal and cosine signal according to the curve of the sinusoidal voltage signal and cosine voltage signal. $V_m$ adjusts the amplitude of the fundamental wave of the sinusoidal signal and the cosine signal to a consistent value, after obtaining the compensation amplitude of the fundamental wave of the sinusoidal signal and the cosine signal.

Before measuring the absolute electrical angle of the magnet to be measured, the magnetic encoder needs to be compensated to reduce the error of the magnetic encoder. The method of detecting the absolute electrical angle may further includes:

acquiring a periodic voltage signal detected by the magnetic encoder in response to the magnet rotating 360 degrees.

Specifically, the magnet to be tested can be controlled to rotate 360 degrees, the magnetic encoder measures the voltage signal of the magnet to be measured during the rotation. Then this signal is introduced into an error calculation formula to calculate and obtain the bias, which is stored for further signal calibration.

substituting the periodic voltage signal into bias calculation formulas to obtain biases and amplitude compensations of the voltage signal, and respectively storing the obtained biases as the bias error of the preset sinusoidal signal $V_{s0}$, and the bias error of the preset cosine signal $V_{c0}$, storing the obtained amplitude compensations as the amplitude compensation to the fundamental wave of the preset sinusoidal signal $V_{sm}$, and the amplitude compensation to the fundamental wave of the preset cosine signal $V_{cm}$;

a bias error calculation formula being $$\begin{cases} V_{s0} = \dfrac{1}{2N\pi} \int_0^{2N\pi} V_s(\theta_e) d\theta_e \\ V_{c0} = \dfrac{1}{2N\pi} \int_0^{2N\pi} V_c(\theta_e) d\theta_e \end{cases},$$

an amplitude compensation calculation formula being $$\begin{cases} V_{sm} = \dfrac{1}{N\pi} \int_0^{2N\pi} V_s(\theta_e) \cdot \mathrm{Sin}(\theta_e) d\theta_e \\ V_{cm} = \dfrac{1}{N\pi} \int_0^{2N\pi} V_c(\theta_e) \cdot \mathrm{Cos}(\theta_e) d\theta_e \end{cases},$$

in which, N is a number of periods of the periodic signal, $\theta_e$ is an electrical angle of a rotor, $V_{s0}$ is the bias error of the sinusoidal signal, $V_{c0}$ is the bias error of the cosine signal, $V_s(\theta)$ is the sinusoidal signal of the periodic voltage signal, $V_c(\theta)$ is the cosine signal of the periodic voltage signal, $V_{sm}$ is the amplitude compensation to the fundamental wave of the sinusoidal signal; and $V_{cm}$ is the amplitude compensation to the fundamental wave of the cosine signal.

Figure 12:
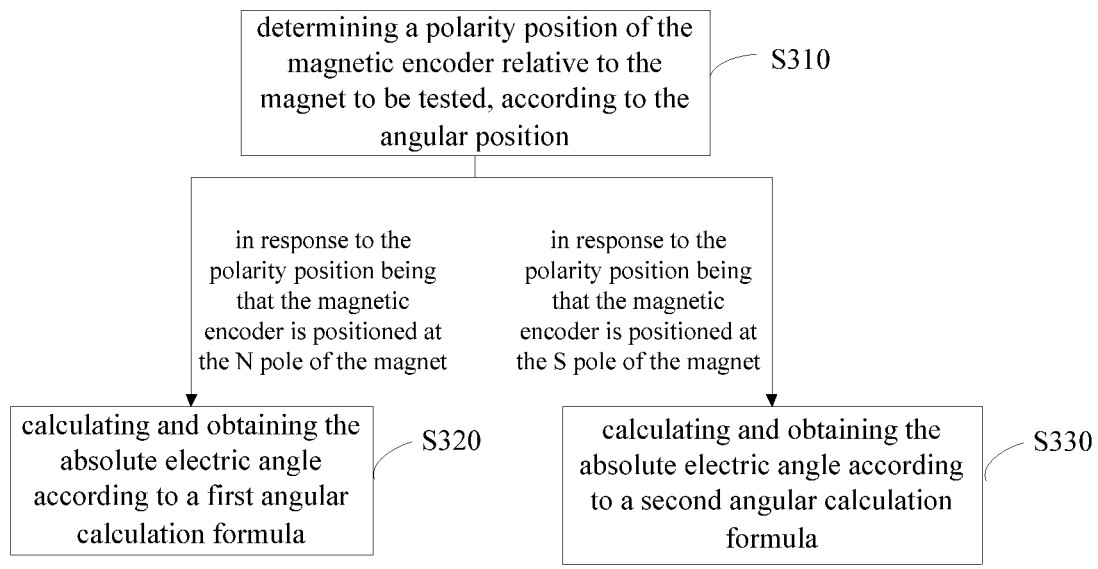
FIG. 12 is a block diagram of a method of detecting the absolute electrical angle according to operation S300 in a third embodiment of the present disclosure.

Specifically, FIG. 12 is referred to, which is a detailed block diagram of the operation calculating and obtaining an absolute electrical angle by using the angle value according to a position of the magnetic encoder according to the present disclosure. Based on the above embodiment, operation S300 includes:

Operation S310: determining a polarity position of the magnetic encoder relative to the magnet to be tested, according to the angular position;

Operation S320, in response to the polarity position being that the magnetic encoder is positioned at the N pole of the magnet, calculating and obtaining the absolute electric angle according to a first angular calculation formula;

Operation S330, in response to the polarity position being that the magnetic encoder is positioned at the S pole of the magnet, calculating and obtaining the absolute electric angle according to a second angular calculation formula.

wherein, the first angular calculation formula is $\theta=\theta_c/2$; the second angular calculation formula is $\theta=\theta_c/2+180°$, $\theta$ being an absolute electrical angle, and $\theta_c$ being a relative electrical angle value.

Specifically, when the magnetic encoder is facing the N pole of the magnet, the absolute electrical angle of the magnet can be calculated by a first angular calculation formula, wherein the first angular calculation formula is: in which $\theta$ is the absolute electrical angle, and $\theta_c$ is the angle value. When the magnetic encoder is facing the S pole of the magnet, the absolute electrical angle of the magnet to be measured can be calculated by a second angular calculation formula. the second angular calculation formula is, in which $\theta$ is the absolute electrical angle, and $\theta_c$ is the angle value.

Figure 13:
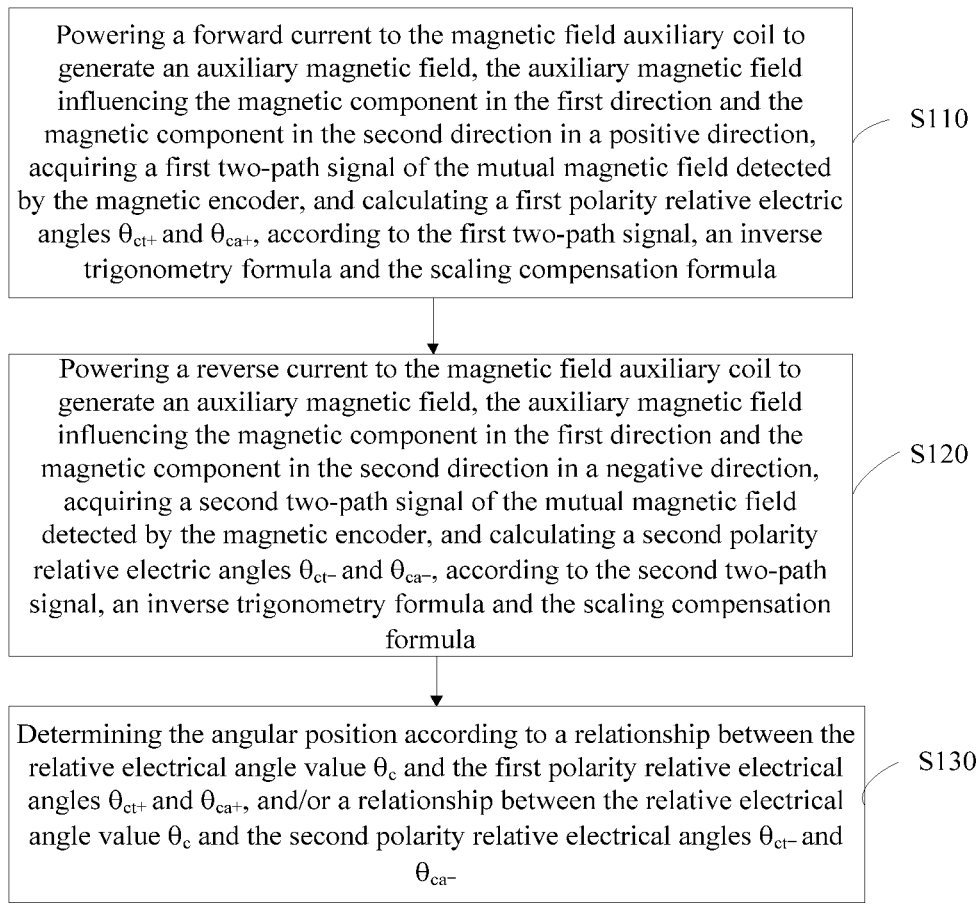
FIG. 13 is a block diagram of a method of detecting the absolute electrical angle according to operation S100 in a third embodiment of the present disclosure.

Please refer to FIG. 13, which is a detailed block diagram of a method of detecting the absolute electrical angle according to operation S100 in a second embodiment of the present disclosure. Based on the above embodiment, operation S100 includes:

Operation S110, powering a forward current to the magnetic field auxiliary coil to generate an auxiliary magnetic field, which influences the magnetic field component in the first direction and the magnetic field component in the second direction in a positive direction, acquiring a first two-path signal of the resultant magnetic field detected by the magnetic encoder, and calculating a first polarity relative electric angles $\theta_{ct+}$ and $\theta_{ca+}$, according to the first two-path signal, an inverse trigonometry formula and the scaling compensation formula;

Operation S120, powering a reverse current to the magnetic field auxiliary coil to generate an auxiliary magnetic field, the field influencing the magnetic field component in the first direction and the magnetic field component in the second direction in a negative direction, acquiring a second two-path signal of the resultant magnetic field detected by the magnetic encoder, and calculating a second polarity relative electric angles $\theta_{ct-}$ and $\theta_{ca-}$, according to the second two-path signal, an inverse trigonometry formula and the scaling compensation formula.

The forward current and reverse current are merely to indicate that the direction of the two currents are opposite. And the corresponding influence in a positive direction and influence in a negative direction are only to indicate that the two influences are opposite, which does not indicate that the positive direction influence is the increase of magnetic component or the reverse direction influence is the decrease of magnetic component. For example, if the influence in a positive direction refers to the increase of the tangential magnetic component, the influence in a negative direction refers to the decrease of the tangential magnetic component; if the influence in a positive direction refers to the decrease of the tangential magnetic component, the influence in a negative direction refers to the increase of the tangential magnetic component.

Operation S130, determining the angular position according to a relationship between the relative electrical angle value $\theta_c$ and the first polarity relative electrical angles $\theta_{ct+}$ and $\theta_{ca+}$, and/or a relationship between the relative electrical angle value $\theta_c$ and the second polarity relative electrical angles $\theta_{ct-}$ and $\theta_{ca-}$.

Specifically, if the angular position can be determined by either the relationship between the relative electrical angle value $\theta_c$ and the relative electrical angles $\theta_{ct+}$ and $\theta_{ca+}$ of the first polarity, or the relationship between the relative electrical angle $\theta_c$ of the second polarity and the relative electrical angles $\theta_{ct-}$ and $\theta_{ca-}$ of the second polarity, it is optional to choose either of them; if the angular position cannot be determined by a single angular relationship, another angular relationship has to be used for determination.

In addition, the present disclosure further provides a computer readable storage medium.

The computer readable storage medium of the present disclosure stores a program for detecting an absolute electrical angle. When the program for detecting an absolute electrical angle is executed by the processor, the operations of the absolute electrical angle detection method as described above are implemented.

The method implemented when the program for detecting an absolute electrical angle is executed can refer to various embodiments of the method for detecting the absolute electrical angle as described above in the present disclosure, and will not be described herein.

It should be appreciated by those skilled in the art that embodiments of the present disclosure may be provided as methods, systems, or computer program products. Therefore, the present disclosure may take either form of an entirely hardware embodiment, an entirely software embodiment, or an embodiment combining software and hardware aspects. Furthermore, the present disclosure may take the form of a computer program product implemented on one or more computer usable storage media (including but not limited to magnetic disk memory, CD-ROM, optical memory, etc.) having computer usable program code embodied therein.

The present disclosure is described with reference to flowcharts and/or block diagrams of methods, apparatus (systems), and computer program products according to embodiments of the present disclosure. It should be appreciated that each flow and/or block in the flowchart and/or block diagram, and combinations of flows and/or blocks in the flowchart and/or block diagram, may be implemented by computer program instructions. These computer program instructions may be provided to a processor of a general purpose computer, special purpose computer, embedded processor, or other programmable data processing apparatus to produce a machine, such that the instructions executed by the processor of the computer or other programmable data processing apparatus produce means for implementing the functions specified in the flowchart flow or flows and/or block or blocks of the block diagram.

These computer program instructions may further be stored in a computer-readable memory that can direct a computer or other programmable data processing apparatus to function in a particular manner, such that the instructions stored in the computer-readable memory produce an article of manufacture including instruction means that implement the functions specified in the flowchart flow or flows and/or block or blocks of the block diagram.

These computer program instructions may further be loaded onto a computer or other programmable data processing apparatus such that a series of operational operations are performed on the computer or other programmable apparatus to produce a computer implemented process, such that the instructions that execute on the computer or other programmable apparatus provide operations for implementing the functions specified in the flowchart flow or flows and/or block or blocks of the block diagram.

It should be appreciated that in the claims, any reference signs placed between parentheses shall not be construed as limiting the claims. The word "comprising" does not exclude the presence of elements or operations not listed in a claim. The word "a" or "an" preceding a component does not exclude the presence of a plurality of such components. The present disclosure can be implemented by means of hardware comprising several different components and by means of a suitably programmed computer. In a unit claim enumerating several means, several of these means may be embodied by one and the same item of hardware. The use of words first, second, third, etc. does not indicate any order, which can be interpreted as naming.

Although the preferred embodiments of the present disclosure have been described, those skilled in the art can make additional changes and modifications to these embodiments once they know the basic inventive concepts. Therefore, the appended claims are intended to be interpreted as including the preferred embodiment and all changes and modifications that fall within the scope of the present disclosure.

The above is only the optional embodiment of the present disclosure and is not therefore constitute a limitation to the present disclosure. Any equivalent structure modification perceived by using the contents of the present specification and drawings, or directly or indirectly applied in other related technical fields, shall be included in the protection scope of the present application.

What is claimed is:

1. A method for detecting an absolute electrical angle based on a magnetic encoder, the magnetic encoder being configured to detect a 2-dimension magnetic field component of a magnetic field generated by a magnet to be tested, and the 2-dimension magnetic field component comprising a magnetic field component in a first direction and a magnetic field component in a second direction, the magnetic encoder comprises a magnetoresistance sensor, a magnetic field auxiliary coil and a coil current control circuit electrically connected with the magnetic field auxiliary coil, the magnetoresistance sensor being a planar component, the coil current control circuit being configured to supply current to the magnetic field auxiliary coil, to allow the magnetic field auxiliary coil to generate an auxiliary magnetic field, the auxiliary magnetic field influencing the magnetic field component in the first direction and the magnetic field component in the second direction, and forming a resultant magnetic field, and the magnetoresistance sensor being configured to detect the resultant magnetic field and the components of the 2-dimension magnetic field generated by the magnet;

the method comprising:

controlling the magnetic field auxiliary coil to generate an auxiliary magnetic field influencing the magnetic field component in the first direction and the magnetic field component in the second direction, forming the resultant magnetic field, acquiring a first voltage signal of the resultant magnetic field detected by the magnetic encoder, and determining an angular position of the magnetic encoder according to the first voltage signal;

acquiring a second voltage signal detected by the magnetic encoder of the 2-dimension magnetic field component of the magnetic field of the magnet, and calculating and obtaining a relative electric angle value according to the second voltage signal and an inverse trigonometric formula; and calculating the absolute electrical angle according to the angular position of the magnetic encoder and the relative electrical angle value;

the operation of acquiring the second voltage signal detected by the magnetic encoder of the 2-dimension magnetic field component of the magnetic field of the magnet, and calculating and obtaining the relative electric angle value according to the second voltage signal and the inverse trigonometric formula comprises:

acquiring the second voltage signal detected by the magnetic encoder of the 2-dimension magnetic field component of the magnetic field of the magnet, the second voltage signal comprising an angular sinusoidal signal and an angular cosine signal;

calculating a scaling compensation sinusoidal signal and a scaling compensation cosine signal, according to the angular sinusoidal signal, the angular cosine signal and a scaling compensation formula;

calculating and obtaining the relative electric angle value according to the scaling compensation sinusoidal signal and the scaling compensation signal, the scaling compensation formula being:

$$\begin{cases} V_{sc}(\theta) = [V_s(\theta) - V_{s0}] \cdot V_m / V_{sm} \\ V_{cc}(\theta) = [V_c(\theta) - V_{c0}] \cdot V_m / V_{cm} \end{cases},$$

wherein,
$V_{sc}(\theta)$ is a scaling compensation sinusoidal signal;
$V_{cc}(\theta)$ is a scaling compensation cosine signal;
$V_s(\theta)$ is an angular sinusoidal signal;
$V_c(\theta)$ is an angular cosine signal;
$V_{s0}$ is a bias error of a preset sinusoidal signal;
$V_{c0}$ is a bias error of a preset cosine signal;
$V_m$ is a preset adjusting amplitude;
$V_s m$ is an amplitude compensation to a fundamental wave of the preset sinusoidal signal; and
$V_{cm}$ is an amplitude compensation to the fundamental wave of the preset cosine signal.

2. The method according to claim 1, wherein:
the magnetic field auxiliary coil comprises a fourth coil and two paralleled third coils;
the coil current control circuit is electrically connected with both of the two third coils and the fourth coil, and configured to:
supply a current to the two third coils, and
control a direction of the current to generate a first interfering magnetic field to influence the magnetic field component in the first direction;
the coil current control circuit is further configured to:
supply a current to the fourth coil and control a direction of the current to generate a second interfering magnetic field to influence the magnetic field component in the second direction,
the first interfering magnetic field and the second interfering magnetic field interacting to form the auxiliary magnetic field.

3. The method according to claim 1, further comprising:
acquiring a periodic voltage signal detected by the magnetic encoder in response to the magnet rotating 360 degrees;
substituting the periodic voltage signal into error calculation formulas to obtain biases and amplitude compensations of the voltage signal, and respectively storing the obtained biases as the bias error of the preset sinusoidal signal Vs0, and the bias error of the preset cosine signal Vc0, storing the obtained amplitude compensations as the amplitude compensation to the fundamental wave of the preset sinusoidal signal Vsm, and the amplitude compensation to the fundamental wave of the preset cosine signal Vcm;
a bias calculation formula being:

$$\begin{cases} V_{s0} = \dfrac{1}{2N\pi} \int_0^{2N\pi} V_s(\theta_e) d\theta_e \\ V_{c0} = \dfrac{1}{2N\pi} \int_0^{2N\pi} V_c(\theta_e) d\theta_e \end{cases},$$

an amplitude compensation calculation formula $$\begin{cases} V_{sm} = \dfrac{1}{N\pi} \int_0^{2N\pi} V_s(\theta_e) \cdot \mathrm{Sin}(\theta_e) d\theta_e \\ V_{cm} = \dfrac{1}{N\pi} \int_0^{2N\pi} V_c(\theta_e) \cdot \mathrm{Cos}(\theta_e) d\theta_e \end{cases},$$

wherein N is a number of periods of the periodic signal;
$\theta_e$ is an electrical angle of a rotor;
$V_{s0}$ is the bias error of the preset sinusoidal signal;
$V_{c0}$ is the bias error of the preset cosine signal, $V_s(\theta)$ is the sinusoidal signal of the periodic voltage signal;
$V_c(\theta)$ is the cosine signal of the periodic voltage signal;
$V_{sm}$ is the amplitude compensation to the fundamental wave of the preset sinusoidal signal; and
$V_{cm}$ is the amplitude compensation to the fundamental wave of the preset cosine signal.

4. The method according to claim 1, wherein:
the operation of calculating the absolute electrical angle according to the angular position of the magnetic encoder and the relative electrical angle value comprises:
determining a polarity position of the magnetic encoder relative to the magnet to be tested, according to the angular position;
in response to the polarity position being that the magnetic encoder is positioned at the N pole of the magnet, calculating and obtaining the absolute electric angle according to a first angular calculation formula;
in response to the polarity position being that the magnetic encoder is positioned at the S pole of the magnet, calculating and obtaining the absolute electric angle according to a second angular calculation formula;
wherein, the first angular calculation formula is $\theta=\theta_c/2$;
the second angular calculation formula is $\theta=\theta_c/2+180°$,
$\theta$ being an absolute electrical angle, and $\theta_c$ being a relative electrical angle value.

5. The method according to claim 4, wherein:
the operation of controlling the magnetic field auxiliary coil to generate the auxiliary magnetic field influencing the magnetic field component in the first direction and the magnetic field component in the second direction and forming the resultant magnetic field, acquiring the first voltage signal of the resultant magnetic field detected by the magnetic encoder, and determining the angular position of the magnetic encoder according to the first voltage signal comprises:
powering a forward current to the magnetic field auxiliary coil to generate the auxiliary magnetic field, the auxiliary magnetic field influencing the magnetic field component in the first direction and the magnetic field component in the second direction in a forward direction, acquiring a first two-path signal of the resultant magnetic field detected by the magnetic encoder, and calculating a first polarity relative electric angles $\theta_{ct+}$ and $\theta_{ca+}$, according to the first two-path signal, an inverse trigonometry formula and the scaling compensation formula;
powering a reverse current to the magnetic field auxiliary coil to generate the auxiliary magnetic field, the auxiliary magnetic field influencing the magnetic field component in the first direction and the magnetic field component in the second direction in a reverse direction, acquiring a second two-path signal of the resultant magnetic field detected by the magnetic encoder, and calculating a second polarity relative electric angles $\theta_{ct-}$ and $\theta_{ca-}$, according to the second two-path signal, the inverse trigonometry formula and the scaling compensation formula; and
determining the angular position according to a relationship between the relative electrical angle value $\theta_c$ and the first polarity relative electrical angles $\theta_{ct+}$ and $\theta_{ca+}$, and/or a relationship between the relative electrical angle value $\theta_c$ and the second polarity relative electrical angles $\theta_{ct-}$ and $\theta_{ca-}$.

6. A system of detecting an absolute electrical angle, comprising a magnetic encoder and a control device, the control device comprising a processor, a memory, and a program stored on the memory and executable by the processor, configured to detect the absolute electrical angle, wherein operations of the method as recited in claim 5 are implemented, when the program is executed by the processor.

7. A method for detecting an absolute electrical angle based on a magnetic encoder, the magnetic encoder being configured to detect a 2-dimension magnetic field component of a magnetic field generated by a magnet to be tested, and the 2-dimension magnetic field component comprising a magnetic field component in a first direction and a magnetic field component in a second direction, the magnetic encoder comprises a magnetoresistance sensor, a magnetic field auxiliary coil and a coil current control circuit electrically connected with the magnetic field auxiliary coil, the magnetoresistance sensor being a planar component,
the coil current control circuit being configured to supply current to the magnetic field auxiliary coil, to allow the magnetic field auxiliary coil to generate an auxiliary magnetic field,
the auxiliary magnetic field influencing the magnetic field component in the first direction and the magnetic field component in the second direction, and forming a resultant magnetic field, and
the magnetoresistance sensor being configured to detect the resultant magnetic field and the components of the 2-dimension magnetic field generated by the magnet;
the method comprising:
controlling the magnetic field auxiliary coil to generate an auxiliary magnetic field influencing the magnetic field component in the first direction and the magnetic field component in the second direction, forming the resultant magnetic field, acquiring a first voltage signal of the resultant magnetic field detected by the magnetic encoder, and determining an angular position of the magnetic encoder according to the first voltage signal;
acquiring a second voltage signal detected by the magnetic encoder of the 2-dimension magnetic field component of the magnetic field of the magnet, and calculating and obtaining a relative electric angle value according to the second voltage signal and an inverse trigonometric formula; and
calculating the absolute electrical angle according to the angular position of the magnetic encoder and the relative electrical angle value;
wherein the magnetic field auxiliary coil comprises a first coil and a second coil that are arranged in parallel,
the first coil and the second coil are located in a same plane;
the coil current control circuit is electrically connected with both of the first coil and the second coil,
the method further comprises:
supplying, by the coil current control circuit, current to the first coil and the second coil and control a direction of the current in the first coil and in the second coil, and
generating, by the coil current control circuit, the auxiliary magnetic field influencing the magnetic components in the first direction and the second direction the operation of acquiring the second voltage signal detected by the magnetic encoder of the 2-dimension magnetic field component of the magnetic field of the magnet, and calculating and obtaining the relative electric angle value according to the second voltage signal and the inverse trigonometric formula comprises:

acquiring the second voltage signal detected by the magnetic encoder of the 2-dimension magnetic field component of the magnetic field of the magnet, the second voltage signal comprising an angular sinusoidal signal and an angular cosine signal;
calculating a scaling compensation sinusoidal signal and a scaling compensation cosine signal, according to the angular sinusoidal signal, the angular cosine signal and a scaling compensation formula;
calculating and obtaining the relative electric angle value according to the scaling compensation sinusoidal signal and the scaling compensation signal,
the scaling compensation formula being:

$$\begin{cases} V_{sc}(\theta) = [V_s(\theta) - V_{s0}] \cdot V_m / V_{sm} \\ V_{cc}(\theta) = [V_c(\theta) - V_{c0}] \cdot V_m / V_{cm} \end{cases},$$

wherein,
$V_{sc}(\theta)$ is a scaling compensation sinusoidal signal;
$V_{cc}(\theta)$ is a scaling compensation cosine signal;
$V_s(\theta)$ is an angular sinusoidal signal;
$V_c(\theta)$ is an angular cosine signal;
$V_{s0}$ is a bias error of a preset sinusoidal signal;
$V_{c0}$ is a bias error of a preset cosine signal;
$V_m$ is a preset adjusting amplitude;
$V_{sm}$ is an amplitude compensation to a fundamental wave of the preset sinusoidal signal; and
$V_{cm}$ is an amplitude compensation to the fundamental wave of the preset cosine signal.

8. The method according to claim 7, further comprising:
acquiring a periodic voltage signal detected by the magnetic encoder in response to the magnet rotating 360 degrees;
substituting the periodic voltage signal into error calculation formulas to obtain biases and amplitude compensations of the voltage signal, and respectively storing the obtained biases as the bias error of the preset sinusoidal signal Vs0, and the bias error of the preset cosine signal Vc0, storing the obtained amplitude compensations as the amplitude compensation to the fundamental wave of the preset sinusoidal signal $V_{sm}$, and the amplitude compensation to the fundamental wave of the preset cosine signal $V_{cm}$;
a bias calculation formula being:

$$\begin{cases} V_{s0} = \dfrac{1}{2N\pi} \int_0^{2N\pi} V_s(\theta_e) d\theta_e \\ V_{c0} = \dfrac{1}{2N\pi} \int_0^{2N\pi} V_c(\theta_e) d\theta_e \end{cases},$$

an amplitude compensation calculation formula $$\begin{cases} V_{sm} = \dfrac{1}{N\pi} \int_0^{2N\pi} V_s(\theta_e) \cdot \mathrm{Sin}(\theta_e) d\theta_e \\ V_{cm} = \dfrac{1}{N\pi} \int_0^{2N\pi} V_c(\theta_e) \cdot \mathrm{Cos}(\theta_e) d\theta_e \end{cases},$$

wherein N is a number of periods of the periodic signal;
$\theta_e$ is an electrical angle of a rotor;
$V_{s0}$ is the bias error of the preset sinusoidal signal;
$V_{c0}$ is the bias error of the preset cosine signal, $V_s(\theta)$ is the sinusoidal signal of the periodic voltage signal;

$V_c(\theta)$ is the cosine signal of the periodic voltage signal;

$V_{sm}$ is the amplitude compensation to the fundamental wave of the preset sinusoidal signal; and $V_{cm}$ is the amplitude compensation to the fundamental wave of the preset cosine signal.

9. The method according to claim 7, wherein:

the operation of calculating the absolute electrical angle according to the angular position of the magnetic encoder and the relative electrical angle value comprises:

determining a polarity position of the magnetic encoder relative to the magnet to be tested, according to the angular position;

in response to the polarity position being that the magnetic encoder is positioned at the N pole of the magnet, calculating and obtaining the absolute electric angle according to a first angular calculation formula;

in response to the polarity position being that the magnetic encoder is positioned at the S pole of the magnet, calculating and obtaining the absolute electric angle according to a second angular calculation formula;

wherein, the first angular calculation formula is $\theta=\theta_c/2$;

the second angular calculation formula is $\theta=\theta_c/2+180°$, $\theta$ being an absolute electrical angle, and $\theta_c$ being a relative electrical angle value.

10. The method according to claim 9, wherein:

the operation of controlling the magnetic field auxiliary coil to generate the auxiliary magnetic field influencing the magnetic field component in the first direction and the magnetic field component in the second direction and forming the resultant magnetic field, acquiring the first voltage signal of the resultant magnetic field detected by the magnetic encoder, and determining the angular position of the magnetic encoder according to the first voltage signal comprises:

powering a forward current to the magnetic field auxiliary coil to generate the auxiliary magnetic field, the auxiliary magnetic field influencing the magnetic field component in the first direction and the magnetic field component in the second direction in a forward direction, acquiring a first two-path signal of the resultant magnetic field detected by the magnetic encoder, and calculating a first polarity relative electric angles $\theta_{ct+}$ and $\theta_{ca+}$, according to the first two-path signal, an inverse trigonometry formula and the scaling compensation formula;

powering a reverse current to the magnetic field auxiliary coil to generate the auxiliary magnetic field, the auxiliary magnetic field influencing the magnetic field component in the first direction and the magnetic field component in the second direction in a reverse direction, acquiring a second two-path signal of the resultant magnetic field detected by the magnetic encoder, and calculating a second polarity relative electric angles $\theta_{ct-}$ and $\theta_{ca-}$, according to the second two-path signal, the inverse trigonometry formula and the scaling compensation formula; and determining the angular position according to a relationship between the relative electrical angle value $\theta_c$ and the first polarity relative electrical angles $\theta_{ct+}$ and $\theta_{ca+}$, and/or a relationship between the relative electrical angle value $\theta_c$ and the second polarity relative electrical angles $\theta_{ct-}$ and $\theta_{ca-}$.

\* \* \* \* \*